US006353637B1

(12) United States Patent
Mansour et al.

(10) Patent No.: US 6,353,637 B1
(45) Date of Patent: Mar. 5, 2002

(54) MULTISTREAM IN-BAND ON-CHANNEL SYSTEMS

(75) Inventors: David Mansour, Fair Lawn; Deepen Sinha; Carl-Erik Wilhelm Sundberg, both of Chatham, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/290,819

(22) Filed: Apr. 13, 1999

Related U.S. Application Data

(63) Continuation-in-part of application No. 09/280,280, filed on Mar. 29, 1999.

(51) Int. Cl.[7] .......................... H04K 1/10; H04L 27/28

(52) U.S. Cl. ........................ 375/260; 370/536; 455/513

(58) Field of Search ............................ 455/108, 88, 91, 455/104, 45, 74, 47, 63, 109, 450, 464, 509, 513; 375/277, 262, 260; 370/529, 536; 381/3

(56) References Cited

U.S. PATENT DOCUMENTS

| | | | | | |
|---|---|---|---|---|---|
| 3,634,766 A | * | 1/1972 | Boyer | | 325/50 |
| 3,967,202 A | * | 6/1976 | Batz | | 325/31 |
| 5,442,646 A | * | 8/1995 | Chadwick et al. | | 371/43 |
| 5,463,641 A | | 10/1995 | Dorward et al. | | |
| 5,949,796 A | * | 9/1999 | Kumar | | 370/529 |
| 6,031,874 A | * | 2/2000 | Chennakeshu et al. | | 375/262 |
| 6,230,022 B1 | * | 5/2001 | Sakoda et al. | | 455/522 |
| 6,240,275 B1 | * | 5/2001 | HaMimy et al. | | 455/62 |

OTHER PUBLICATIONS

D. Sinha, J.D. Johnston, S. Dorward and S.R. Quackenbush, "The Perceptual Audio Coder," in Digital Audio, Section 42, pp. 42–1 to 42–18, CRC Press, 1998.

N.S. Jayant and E.Y. Chen, "Audio Compression: Technology and Applications," AT&T Technical Journal, pp. 23–34, vol. 74, No. 2, Mar.–Apr. 1995.

J. Hagenauer, "Rate Compatible Punctured Convoluntional Codes (RCPC Codes) and their Applications," IEEE Transactions on Communications, vol. 36, No. 4, pp. 389–400, Apr. 1988.

J. Hagenauer et al., "The Performance of Rate–Compatible Punctured Convolutional Codes for Digtial Mobile Radio," IEEE Transactions on Communications, vol. 38, No. 7, pp. 966–980, Jul. 1990.

(List continued on next page.)

*Primary Examiner*—Dwayne Bost
*Assistant Examiner*—Lewis West
(74) *Attorney, Agent, or Firm*—Ryan, Mason & Lewis, LLP

(57) ABSTRACT

Methods and apparatus for processing information, e.g., audio, speech, video or image information, for transmission in a communication system. In an illustrative embodiment, a set of bit streams are generated from an audio information signal. The set of bit streams may be, e.g., a total of four bit streams generated by separating each of two multiple description bit streams, corresponding to separate representations of the audio information signal, into first and second class bit streams. The first and second class bit streams associated with the first multiple description bit stream may then be transmitted in respective first and second subbands of a first sideband of an FM host carrier, while the first and second class bit streams associated with the second multiple description bit stream are transmitted in respective first and second subbands of a second sideband of the FM host carrier. The first class bit streams may be provided with a different level of error protection than the second class bit streams, e.g., by utilizing different portions of a non-uniform power profile for the corresponding subbands, or by placement of the bit streams in subbands having different susceptibility to interference. Delay may be introduced between at least a subset of the bit streams in order to provide improved performance, e.g., in the presence of fading.

30 Claims, 8 Drawing Sheets

OTHER PUBLICATIONS

R.V. Cox et al., "Sub–band Speech Coding and Matched Convolutional Channel Coding for Mobile Radio Channels," IEEE Transactions on Acoustics, Speech and Signal Processing, vol. 39, No. 8, pp. 1717–1731, Aug. 1991.

B.W. Kroeger and A.J. Vigil, "Improved IBOC DAB Technology for AM and FM Broadcasting," SBE Engineering Conference, pp. 1–10, 1996.

B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.

B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.

* cited by examiner

*FIG. 4*

| SYSTEM # | AUDIO CODER RATE kb/s ONE/TWO SIDEBANDS | CHANNEL CODE RATE ONE SIDEBAND | CHANNEL CODE RATE TWO SIDEBAND | POWER PROFILE | SOURCE CODER TYPE | CHANNEL CODE TYPE | MS |
|---|---|---|---|---|---|---|---|
| 1 | 96/96 | 4/5 | 2/5 | a | | OBP CPPC | 1 |
| 2 | 64/64 | 1/2 | 1/4 | a | | OBP CPPC | 1 |
| 3 | 64/128 | 1/2 | 1/2 | a,a+ | MD | CC | 2 |
| 4 | 64/64 | 1/2 | 1/4 | b,c,d,e | | OBP CPPC | 1 |
| 5 | 64/128 | 1/2 | 1/2 | b,c,d,e | MD | CC | 2 |
| 6 | 64/128 | 1/2 | 1/2 | b,c,d,e | MD C/E | CC | 3 |
| 7 | 64/128 | 1/2 | 1/2 | b,c,d,e | MD UEP2 | CC | 4/6 |
| 8 | 64/128 | 1/2 | 1/2 | b,c,d,e | MD C/E | CC | 4/6 |
| 9 | 64/128 | 1/2 | 1/2 | a,a+ | MD UEP2 | CC | 4 |

| AVAILABLE STREAMS | CORRESPONDING QUALITY |
|---|---|
| I + I' + II + II' | 96 kbps SINGLE STREAM PAC |
| (I + II + II') OR (I' + II' + II) | BETTER THAN 64 kbps PAC |
| (I + II) OR (I' + II') | BETTER THAN ANALOG FM |
| (I + I') | UNKNOWN |
| I OR I' | ——— |

FIG. 9

| M + 1 | GENERATORS | $d_f$ | ($a_d$, $d = d_f, d_f + 1, \ldots, d_f + 19$)<br>[$c_d$, $d = d_f, d_f + 1, \ldots, d_f + 19$] |
|---|---|---|---|
| 7 | 133, 171 | 10 | (11,0,38,0,193,0,1331,0,7275,0,40406,0,234969,0,1337714,0,7594819,0,43375588,0)<br>[36,0,211,0,1404,0,11633,0,77433,0,502690,0,3322763,0,21292910,0,134365911,0,843425871,0] |
| 8 | 247, 371 | 10 | (1,6,12,26,52,132,317,730,1823,4446,10739,25358,60773,146396,350399,842174,2021290,4853474,11648661,27945646)<br>[2,22,60,148,340,1008,2642,6748,18312,48478,126364,320062,821350,2102864,5335734,13549068,34254388,86441848,217480314,545858054] |
| 9 | 561, 753 | 12 | (11,0,50,0,286,0,1630,0,9639,0,55152,0,320782,0,1859184,0,10777264,0,62423710,0)<br>[33,0,281,0,2179,0,15035,0,105166,0,692330,0,4580007,0,29692894,0,190453145,0,1208999091,0] |
| 10 | 1151, 1753 | 12 | (1,7,19,28,69,185,411,1010,2492,5963,14192,34584,83567,200343,483393,1165406,2809777,6773483,16324253,39351344)<br>[2,21,100,186,474,1419,3542,9774,25950,66831,171594,447372,1152976,2938087,7497956,19072552,48400420,122452387,309085546,778801868] |
| 11 | 3345, 3613 | 14 | (14,0,92,0,426,0,2595,0,15221,0,87694,0,509876,0,2975097,0,17303477,0,100650003,0)<br>[56,0,656,0,3708,0,27503,0,185997,0,1220645,0,7966761,0,51581661,0,329655865,0,2089605350,0] |
| 12 | 5261, 7173 | 15 | (14,21,34,101,249,597,1373,3317,8014,19559,47302,113723,274266,662666,1600334,3857052,9308986,22473832,54226452,130860787)<br>[66,98,220,788,2083,5424,13771,35966,93970,246720,635694,1623432,4149988,10599534,26964102,68271886,172723512,436205306,1098861232,2763565986] |
| 13 | 12767, 16461 | 16 | (14,38,35,108,342,724,1604,4020,9825,23899,57724,138584,335272,808236,1952588,4714596,11375389,27462352,66275890,159940379)<br>[60,188,288,952,2754,6628,16606,44640,116712,304987,785180,2002076,5132496,13067080,33236580,84264272,213035502,537722506,1354359096,3404955291] |

FIG. 10

| RATE 1/2 CODES M | $d_f$ | GAIN IN SNR RELATIVE TO M = 6, R = 4/5* | GAIN IN SNR RELATIVE TO M = 6, R = 2/5** |
|---|---|---|---|
| 6 | 10 | 4.0 dB | −0.4 dB |
| 8 | 12 | 4.8 dB | 0.4 dB |
| 10 | 14 | 5.4 dB | 1.0 dB |
| 12 | 16 | 6.0 dB | 1.5 dB |

*$d_f$ = 4 **$d_f$ = 11

FIG. 11

| RATE 2/3 CODES M | $d_f$ | GAIN IN SNR RELATIVE TO M = 6, R = 4/5 |
|---|---|---|
| 6 | 6 | 1.8 dB |
| 8 | 8 | 3.0 dB |

FIG. 12

| RATE 3/4 CODES M | $d_f$ | GAIN IN SNR RELATIVE TO M = 6, R = 4/5 |
|---|---|---|
| 6 | 5 | 1.0 dB |
| 8 | 6 | 1.8 dB |

FIG. 13

| OFDM POWER PROFILE | BANDS B, (B') $P_I$ | BANDS A + C, (A') $P_{II}$ | TOTAL SIDEBAND POWER INCREASE |
|---|---|---|---|
| a, a' | 4 dB | 4 dB | 0 dB |
| a+, a'+ | 7 dB | 7 dB | 3 dB |
| b | 8 dB | 4 dB | 2.4 dB |
| c | 9.1 dB | 6.4 dB | 4.0 dB |
| d | 8 dB | 6.4 dB | 3.3 dB |
| e | 7.3 dB | 5.4 dB | 2.4 dB |

MULTISTREAM IN-BAND ON-CHANNEL SYSTEMS

RELATED APPLICATION

The present application is a continuation-in-part of U.S. patent application Ser. No. 09/280,280, filed Mar. 29, 1999 in the name of inventors Hui-Ling Lou, Deepen Sinha and Carl-Erik W. Sundberg and entitled "Technique for Effectively Communicating Multiple Digital Representations of a Signal," which is assigned to the assignee of the present application and incorporated by reference herein.

FIELD OF THE INVENTION

The present invention relates generally to digital audio broadcasting (DAB) and other techniques for transmitting information, and more particularly to techniques for implementing hybrid in-band on-channel (IBOC) systems for DAB and other applications.

BACKGROUND OF THE INVENTION

The explosive growth of digital communications technology has resulted in an ever-increasing demand for bandwidth for communicating digital audio information, video information and/or data. For example, to efficiently utilize bandwidth to communicate digital audio information, a perceptual audio coding (PAC) technique has been developed. For details on the PAC technique, one may refer to U.S. Pat. No. 5,285,498 issued Feb. 8, 1994 to Johnston; and U.S. Pat. No. 5,040,217 issued Aug. 13, 1991 to Brandenburg et al., both of which are incorporated by reference herein. In accordance with such a PAC technique, each of a succession of time domain blocks of an audio signal representing audio information is coded in the frequency domain. Specifically, the frequency domain representation of each block is divided into coder bands, each of which is individually coded, based on psycho-acoustic criteria, in such a way that the audio information is significantly compressed, thereby requiring a smaller number of bits to represent the audio information than would be the case if the audio information were represented in a more simplistic digital format, such as the PCM format.

Recently, the industry turned its focus to the idea of utilizing preexisting analog amplitude-modulation (AM) frequency band more efficiently to accommodate digital communications as well. However, it is required that any adjustment to the AM band to provide the additional capacity for digital communications does not significantly affect the analog AM signals currently generated by radio stations on the same band for AM radio broadcast. In the United States, adjacent geographic areas covered by AM radio broadcast are assigned different AM carrier frequencies, which are at least 20 kHz apart. Specifically, when they are exactly 20 kHz apart, the AM carrier assigned to the adjacent area is referred to as a "second adjacent carrier." Similarly, when they are 10 kHz apart, the AM carrier assigned to the adjacent area is referred to as a "first adjacent carrier."

An in-band on channel AM (IBOC-AM) (also known as "hybrid IBOC-AM") scheme utilizing bandwidth of the AM band to communicate digital audio information has been proposed. In accordance with the proposed scheme, digitally modulated signals representing the audio information populate, e.g., a 30 kHz digital band centered at an analog host AM carrier. The power levels of the spectrums of the digitally modulated signals are allowed to be equally high across a 10 kHz subband in the digital band on each end thereof.

However, in implementation, it is likely that two such IBOC-AM schemes would be respectively employed in two adjacent areas, to which the host AM carriers assigned are 20 kHz apart. In that case, the 30 kHz digital bands for digital communications centered at the respective host AM carriers overlap each other by 10 kHz, thereby causing undesirable "adjacent channel interference" to each area. In particular, such interference is referred to as "second adjacent channel interference," as the dominant interfering carrier in this instance consists of a second adjacent carrier. For example, the second adjacent channel interference degrades the digital communications in each of the adjacent areas, especially in the parts of the areas which are close to their common border. Similar concerns arise in other types of IBOC systems, e.g., frequency-modulation (FM) IBOC systems, also known as IBOC-FM systems or hybrid IBOC-FM systems, satellite broadcasting systems, Internet radio systems, TV broadcasting systems, etc.

Accordingly, there exists a need for a technique, e.g., based on the PAC technique, for effectively utilizing an existing transmission band, e.g., an AM, FM or other band, for digital communications and treating adjacent channel interference in adjacent areas where IBOC schemes are employed.

SUMMARY OF THE INVENTION

The present invention provides methods and apparatus for multistream transmission and/or reception of information in IBOC digital audio broadcasting and other applications. In accordance with the invention, multiple bit streams are generated from an information signal, and the bit streams are transmitted using frequency bands associated with a host carrier signal, e.g., an AM or FM host carrier signal. The manner in which the multiple bit streams are generated and transmitted may be based on factors such as, e.g., multidescriptive coding, a core/enhancement type of embedded coding, a lower basic coding rate in one frequency band relative to another frequency band, bit error sensitivity classification for unequal error protection (UEP), a non-uniform power profile on the bands, an increased total frequency band power, and an increase in frequency band and bit stream time diversity by introducing delay between bit streams in different bands and/or within the same band. The individual bit streams may be encoded using an outer code, e.g., a CRC code, RS code, BCH code, or other linear block code, and an inner code, e.g., a convolutional code, turbo code, or trellis coded modulation.

In an illustrative embodiment, a set of bit streams are generated from an audio information signal. The set of bit streams may be, e.g., a total of four bit streams generated by separating each of two multiple description bit streams, corresponding to separate representations of the audio information signal, into first and second class bit streams. The first and second class bit streams associated with the first multiple description bit stream may then be transmitted in respective first and second subbands of a first sideband of an FM host carrier, while the first and second class bit streams associated with the second multiple description bit stream are transmitted in respective first and second subbands of a second sideband of the FM host carrier. The first class bit streams may be provided with a different level of error protection than the second class bit streams, e.g., by utilizing different portions of a non-uniform power profile for the corresponding subbands, or by placement of the bit streams in subbands having different susceptibility to interference. Delay may be introduced between at least a subset of the four bit streams in order to provide improved performance, e.g., in the presence of fading.

The invention provides a number of other significant advantages over conventional systems, including, for example, improved coverage area and reduced memory requirements. The invention may be implemented in numerous applications, such as simultaneous multiple program listening and/or recording, simultaneous delivery of audio and data, etc. In addition, one or more of the techniques of the invention can be applied to other types of digital information, including, for example, speech, data, video and image information. Moreover, the invention is applicable not only to perceptual coders but also to other types of source encoders using other compression techniques operating over a wide range of bit rates, and can be used with transmission channels other than radio broadcasting channels.

BRIEF DESCRIPTION OF THE DRAWINGS

FIG. 4 is a table illustrating the configuration of a number of different multistream FM hybrid in-band on-channel (IBOC-FM) systems in accordance with the invention.

FIG. 9 shows examples of rate-1/2 codes that may be utilized in the multistream IBOC-FM systems of the invention.

FIGS. 10 through 13 are tables illustrating performance gains in an exemplary multistream IBOC-FM system in accordance with the invention.

DETAILED DESCRIPTION OF THE INVENTION

Figure 1:
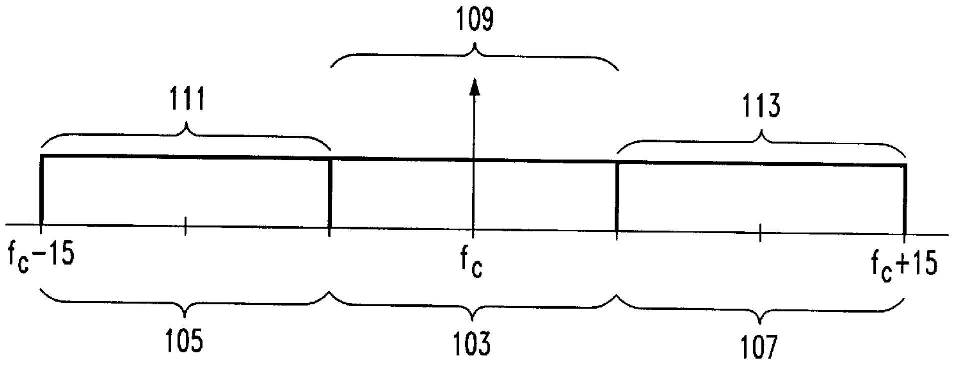
FIG. 1 illustrates a power profile of digitally modulated signals representing multiple bit streams transmitted over corresponding subbands of a frequency band in accordance with the invention.

The invention will be described below in conjunction with exemplary multistream techniques for use in the transmission and reception of audio information bits, e.g., audio bits generated by an audio coder such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998. It should be understood, however, that the multistream techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems.

The invention is directed to techniques for digital communications over multiple frequency bands including, e.g., parts of an amplitude-modulation (AM) or frequency-modulation (FM) frequency band which is currently used by radio stations for respective AM or FM radio broadcast. A system in accordance with the invention may be used to effectively communicate digitally modulated signals representing, e.g., audio information, over an AM or FM frequency band in a geographic area which is assigned an analog host AM or FM carrier whose frequency is $f_c$, despite any adjacent channel interference affecting the digitally modulated signals.

To effectively communicate the audio information and treat any adjacent channel interference, in particular, second adjacent channel interference, in accordance with the invention, multistream coding is implemented in an IBOC system to generate multiple bit streams representing an audio signal containing the audio information, and the bit streams are respectively transmitted through individual subbands within a digital sideband. The audio signal may be recovered using all of the bit streams received or a subset thereof if some of the subbands are severely affected by the adjacent channel interference and/or other adverse channel conditions. The audio quality, e.g., based on a signal-to-noise ratio (SNR) or preferably perceptually based measure, of the recovered signal varies with the underlying, received bit streams used. In general, the more received bit streams are used, the higher the audio quality of the recovered signal. Advantageously, with respect to prior art systems, the inventive system affords increased robustness against adverse channel conditions, and more graceful degradation of digital communications when such conditions occur.

For example, in an illustrative embodiment suitable for use in an IBOC-AM system, three bit streams are used to communicate an audio signal containing audio information. In accordance with the invention, one of the bit streams represents core audio information and is referred to as a "C-stream." The other two bit streams represent first and second enhancement audio information, and are referred to as "$E_1$-stream" and "$E_2$-stream," respectively. Because of the design of the multistream coding described below, the audio signal recovered based on the C-stream alone, although viable, has the minimum acceptable quality; the audio signal recovered based on the C-stream in combination with either $E_1$-stream or $E_2$-stream has relatively high quality; the audio signal recovered based on the C-stream in combination with both $E_1$-stream and $E_2$-stream has the highest quality. However, any audio signal recovered based only on the $E_1$-stream and/or $E_2$-stream is not viable.

Thus, in accordance with an aspect of the invention, the C-stream representing the minimal core audio information is transmitted through subband 103 in FIG. 1 between $f_c$−5 kHz and $f_c$+5 kHz which is immune to second adjacent channel interference; the $E_1$-stream representing first enhancement audio information is transmitted through subband 105 between $f_c$−15 kHz and $f_c$−5 kHz which is subject to second adjacent channel interference; and the $E_2$-stream representing second enhancement audio information is transmitted through subband 107 between $f_c$+5 kHz and $f_c$+15 kHz which is also subject to second adjacent charmel interference. As such, the minimal core audio information would be recoverable despite any second adjacent channel interference, and enhanced by any of $E_1$-stream and $E_2$-stream depending on whether the respective subbands 105 and 107 are severely affected by the second adjacent channel interference.

Figure 2:
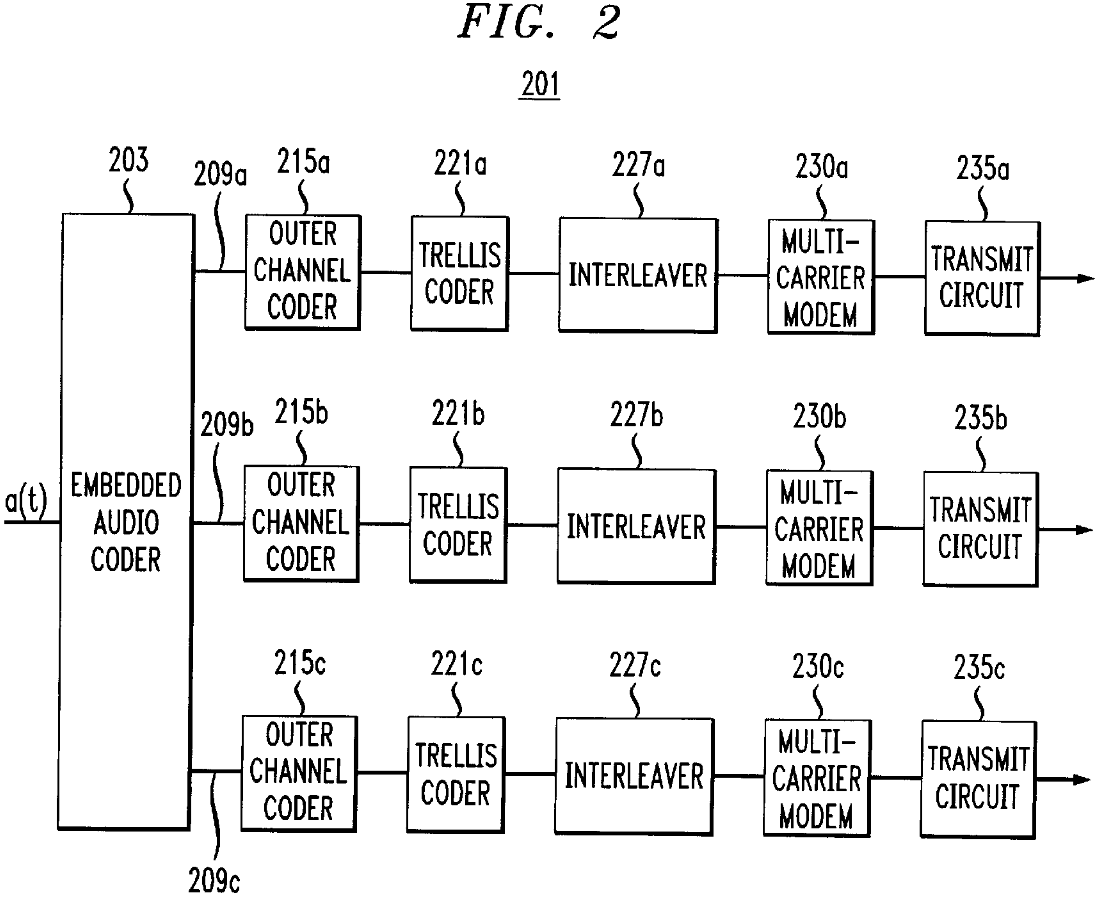
FIG. 2 is a block diagram of a transmitter for transmitting multiple bit streams containing audio information through subbands of a frequency band in accordance with the invention.

FIG. 2 illustrates transmitter 201 in an IBOC-AM communications system embodying the principles of the invention. An analog audio signal a(t) containing audio information to be transmitted by transmitter 201 is fed to embedded audio coder 203 which is fully described below. It suffices to know for now that coder 203 based on the multistream coding generates the aforementioned C-stream, $E_1$-stream and $E_2$-stream representing the analog signal on leads 209*a*, 209*b* and 209*c*, respectively. The bit rates for the C-stream, $E_1$-stream and $E_2$-stream, thus generated, are M kb/sec, S1 kb/sec and S2 kb/sec, respectively. For example, if coder 203 is a 48 kb/sec audio coder, M, S1 and S2 in that case may be set to be 16, 16 and 16, respectively. These bit rates are selected such that if all of the streams are successfully received, the quality of the resulting recovered signal is close to that of a single stream generated by a conventional non-embedded audio coder at M+S1+S2 kb/sec. Similarly, the quality of the resulting signal recovered based on a combination of the C-stream with the $E_1$-stream or $E_2$-stream is close to that of a single stream generated by the conventional non-embedded audio coder at M+S1 kb/sec or M+S2 kb/sec. In addition, the resulting quality corresponding to the combination of the C-stream with the $E_1$-stream or $E_2$-stream is significantly higher than the analog AM quality.

The C-stream on lead 209*a*, $E_1$-stream on lead 209*b* and $E_2$-stream on lead 209*c* are fed to outer channel coder 215*a*, outer channel coder 215*b* and outer channel coder 215*c*, respectively. Outer channel coder 215*a* encodes the C-stream according to a well known forward error correction coding technique, e.g., the Reed-Solomon (RS) coding technique in this instance, or alternatively a cyclic redundancy check (CRC) binary block coding technique, to afford correction and/or detection of errors in the C-stream after its transmission. The C-stream is processed by coder 215*a* on a block by block basis, with each block having a predetermined number of bits. In a conventional manner, coder 215*a* appends the RS check symbols resulting from the encoding to each corresponding block. Similarly, coders 215*b* and 215*c* respectively processes the $E_1$-stream and $E_2$-stream on a block by block basis, and append RS check symbols to each corresponding block of the streams for error correction and/or detection purposes.

The RS coded C-stream, RS coded $E_1$-stream and RS coded $E_2$-stream are fed to trellis coders 221*a*, 221*b* and 221*c*, respectively. Trellis coder 221*a* processes the received RS coded C-stream on a symbol (different from a RS check symbol) interval by symbol interval basis, where the symbol interval has a predetermined duration $T_1$.

In a well known manner, coder 221*a* encodes the received bit stream in accordance with a trellis code to provide the communications system with a so-called "coding gain" which manifests itself in the form of enhance immunity to such random channel impairments as additive noise, without sacrificing the source bit rate or additional broadcast bandwidth. Specifically, coder 221*a* introduces redundancy into the received bit stream in accordance with the trellis code to allow use of a maximum likelihood decoding technique at receiver 301 in FIG. 3 to be described. This redundancy takes the form of one or more additional bits. During each symbol interval, coder 221*a* forms an encoded word, which includes redundancy bits and bits from the received RS coded C-stream and is used to select a symbol from a signal constellation of conventional design. The selected symbols from coder 221*a* are interleaved by interleaver 227*a* to pseudo-randomize the symbols. During each time frame which is $K_1T_1$ long, multicarrier modem 230*a* processes $K_1$ symbols from interleaver 227*a* in accordance with the well known orthogonal frequency division multiplexed (OFDM) scheme, where $K_1$ is a predetermined number. In a well known manner, modem 230*a* generates $K_1$ pulse shaping carriers or digitally modulated signals corresponding to the $K_1$ symbols. The resulting pulse shaping carriers are transmitted by transmit circuit 235*a* through a subband 303 with power profile 309. Transmit circuit 235*a* may include, e.g., a radio-frequency (RF) up-converter, a power amplifier and an antenna, all of conventional design.

Similarly, during each symbol interval $T_2$, trellis coder 221*b* forms an encoded word, which includes redundancy bits and bits from the received RS coded $E_1$-stream and is used to select a symbol from a second predetermined signal constellation, where $T_2$ represents a predetermined duration. The resulting sequence of selected symbols are interleaved by interleaver 227*b* to pseudo-randomize the symbols. During each time frame which is $K_2T_2$ long, multicarrier modem 230*b* processes $K_2$ symbols from interleaver 227*b* in accordance with the well known OFDM scheme, where $K_2$ is a predetermined number. In a well known manner, modem 230*b* generates $K_2$ pulse shaping carriers or digitally modulated signals corresponding to the $K_2$ symbols. The resulting pulse shaping carriers are transmitted by transmit circuit 235*b* through subband 105 with power profile 111.

In addition, during each symbol interval $T_3$, trellis coder 221*c* similarly forms an encoded word, which includes redundancy bits and bits from the received RS coded $E_2$-stream and is used to select a symbol from a third predetermined signal constellation, where $T_3$ represents a predetermined duration. The resulting sequence of selected symbols are interleaved by interleaver 227*c* to pseudo-randomize the symbols. During each time frame which is $K_3T_3$ long, multicarrier modem 230*c* transmits $K_3$ symbols from interleaver 227*b* in accordance with the well known OFDM scheme, where $K_3$ is a predetermined number. In a well known manner, modem 230*b* generates $K_3$ pulse shaping carriers or digitally modulated signals corresponding to the $K_3$ symbols. The resulting pulse shaping carriers are transmitted by transmit circuit 235*c* through subband 107 with power profile 113. If the $E_1$-stream and $E_2$-stream are equivalent and S1=S2, which is the case in this instance, $T_2=T_3$ and $K_2=K_3$.

Figure 3:
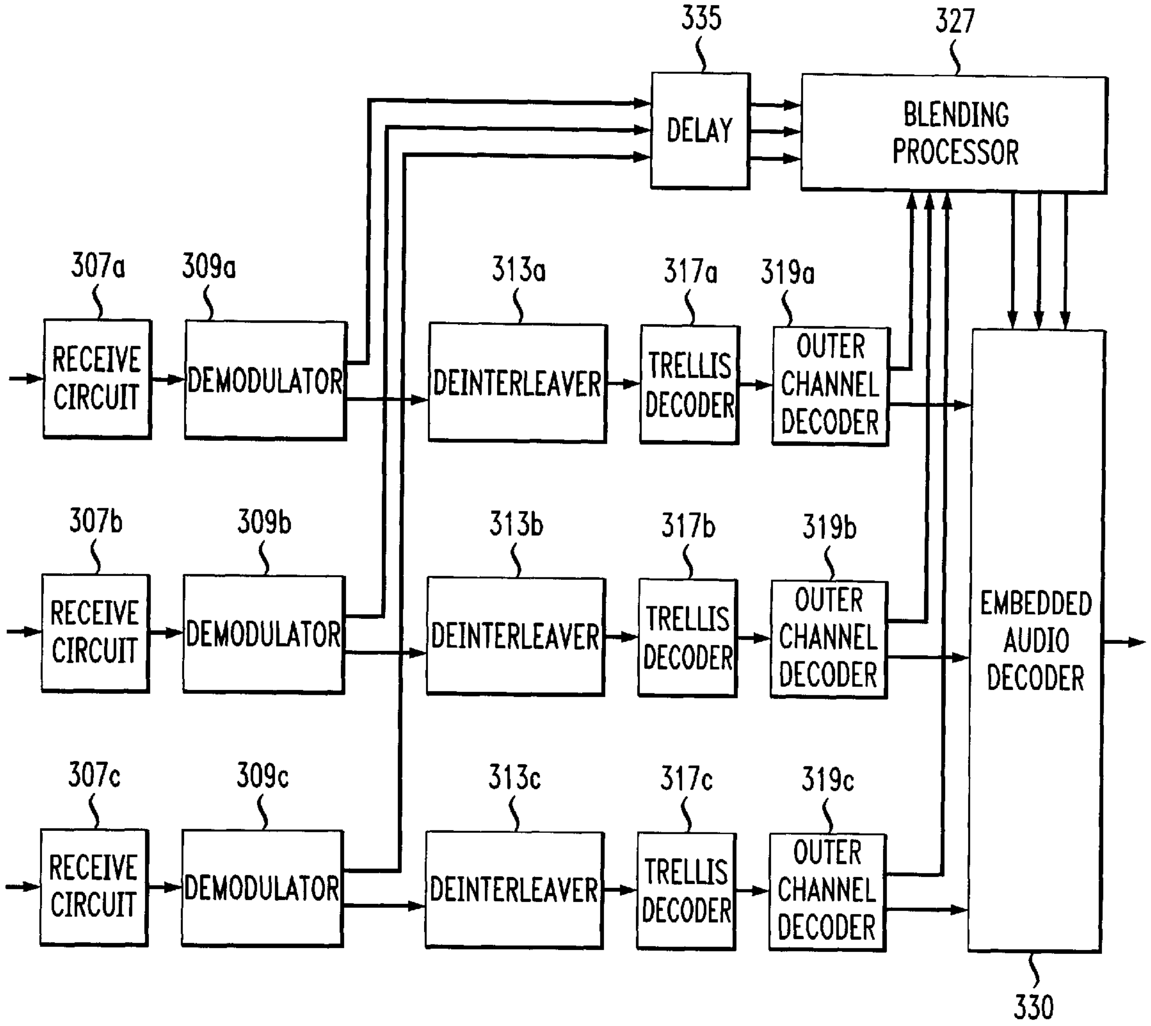
FIG. 3 is a block diagram of a receiver for recovering the audio information transmitted using the transmitter of FIG. 2.

Referring to FIG. 3, receiver 301 receives signals transmitted by transmitter 201 through subbands 103, 105 and 107, respectively. The received signals corresponding to the C-stream, $E_1$-stream and $E_2$-stream are processed by receive circuits 307*a*, 307*b* and 307*c*, which perform inverse functions to above-described transmit circuits 235*a*, 235*b* and 235*c*, respectively. The output of circuit 307*a* comprises the $K_1$ pulse shaping carriers as transmitted, which are fed to demodulator 309*a*. Accordingly, demodulator 309*a* generates a sequence of symbols containing the core audio information. The generated symbols are de-interleaved by de-interleaver 313*a* which performs the inverse function to interleaver 227*a* described above. Based on the de-interleaved symbols and the signal constellation used in trellis coder 221*a*, trellis decoder 317*a* in a conventional manner determines what the most likely transmitted symbols are in accordance with the well known Viterbi algorithm, thereby recovering the C-stream incorporating RS check symbols therein, i.e., the RS coded C-stream. Outer channel decoder 319*a* extracts the RS check symbols from blocks of the RS coded C-stream bits, and examines the RS check symbols in connection with the corresponding blocks of C-stream bits. Each block of C-stream bits may contain errors because of the channel imperfection, e.g., interference with the transmitted signals in subband 103. If the number of errors in each block is smaller than a threshold whose value depends on the actual RS coding technique used, decoder 319*a* corrects the errors in the block. However, if the number of errors in each block is larger than the threshold and the errors are detected by decoder 319*a*, the latter issues, to blending processor 327 described below, a first flag indicating the error detection. Decoder 319*a* then provides the recovered C-stream to embedded audio decoder 330.

Similarly, the output of circuit 307*b* comprises the $K_2$ pulse shaping carriers corresponding the $E_1$-stream, which are fed to demodulator 309*b*. Accordingly, demodulator 309*b* generates a sequence of symbols containing the first enhancement audio information. The generated symbols are de-interleaved by de-interleaver 313*b* which performs the inverse function to interleaver 227*b* described above. Based on the de-interleaved symbols and the signal constellation used in trellis coder 221*b*, trellis decoder 317*b* in a conventional manner determines what the most likely transmitted symbols are in accordance with the Viterbi algorithm, thereby recovering the $E_1$-stream incorporating RS check symbols therein, i.e., the RS coded $E_1$-stream. Outer channel decoder 319*b* extracts the RS check symbols from blocks of the RS coded $E_1$-stream bits, and examines the RS check symbols in connection with the corresponding blocks of $E_1$-stream bits. Each block of $E_1$-stream bits may contain errors because of the channel imperfection, e.g., second adjacent channel interference with the transmitted signals in subband 105. If the number of errors in each block is smaller than the aforementioned threshold, decoder 319*b* corrects the errors in the block. However, if the number of errors in each block is larger than the threshold and the errors are detected by decoder 319*b*, the latter issues, to blending processor 327, a second flag indicating the error detection. Decoder 319*b* then provides the recovered $E_1$-stream to embedded audio decoder 330.

In addition, the output of circuit 307*c* comprises the $K_3$ pulse shaping carriers corresponding the $E_2$-stream, which are fed to demodulator 309*c*. Accordingly, demodulator 309*c* generates a sequence of symbols containing the second enhancement audio information. The generated symbols arc de-interleaved by de-interleaver 313*c* which performs the inverse function to interleaver 227*c* described above. Based on the de-interleaved symbols and the signal constellation used in trellis coder 221*c*, trellis decoder 317*c* in a conventional manner determines what the most likely transmitted symbols are in accordance with the Viterbi algorithm, thereby recovering the $E_2$-stream incorporating RS check symbols therein, i.e., the RS coded $E_2$-stream. Outer channel decoder 319*c* extracts the RS check symbols from blocks of the RS coded $E_2$-stream bits, and examines the RS check symbols in connection with the corresponding blocks of $E_2$-stream bits. Each block of $E_2$-stream bits may contain errors because of the channel imperfection, e.g., second adjacent channel interference with the transmitted signals in subband 107. If the number of errors in each block is smaller than the aforementioned threshold, decoder 319*c* corrects the errors in the block. However, if the number of errors in each block is larger than the threshold and the errors are detected by decoder 319*c*, the latter issues, to blending processor 327, a third flag indicating the error detection. Decoder 319*c* then provides the recovered $E_2$-stream to embedded audio decoder 330.

Embedded audio decoder 330 performs the inverse function to embedded audio coder 203 described above and is capable of blending the received C-stream, $E_1$-stream and $E_2$-stream to recover an audio signal corresponding to a(t). However, blending processor 327 determines any of the $E_1$-stream and $E_2$-stream to be blended with the C-stream in decoder 330. Such a determination is based on measures of data integrity of the $E_1$-stream and $E_2$-stream. Blending processor 327 may also determine the viability of the C-stream based on a measure of its data integrity, and control any audio signal output based on the C-stream from receiver 303. To that end, processor 327 provides first, second and third control signals indicative of the determinations of use of the C-stream, $E_1$-stream and $E_2$-stream, respectively, in decoder 330 to recover the audio signal. In response to such control signals, decoder 330 accordingly (a) operates at the full rate and utilizes all three streams to recover the audio signal, (b) blends to a lower bit rate and utilizes the C-stream in combination with the $E_1$-stream or $E_2$-stream to recover the audio signal, (c) operates at the lowest bit rate and utilizes only the C-stream to recover the audio signal, or (d) recovers no audio signal based on the C-stream. To avoid event (d), although rare, remedial methodologies may be implemented, including transmitting the audio signal through the AM band as a conventional analog AM signal, and recovering the audio signal based on the analog AM signal in the receiver when event (d) occurs.

The measures based on which processor 327 determines whether any of the C-stream, $E_1$-stream and $E_2$-stream is used in recovering the audio signal include, e.g., the frequencies of the first, second and third flags received by processor 327, which are indicative of bit errors in the received C-stream, $E_1$-stream and $E_2$-stream, respectively. The actual frequency threshold beyond which the corresponding stream is rejected or "muted" depends on bit rate of the stream, output quality requirements, etc.

The aforementioned measures may also include an estimate of a signal-to-interference ratio concerning each subband obtained during periodic training of each of modems 230*a*, 230*b* and 230*c*. Since these modems implement multilevel signaling and operate in varying channel conditions, a training sequence with known symbols is used for equalization and level adjustments in demodulators 309*a*, 309*b* and 309*c* periodically. Such a training sequence can be used to estimate the signal-to-interference ratio. When such an estimate goes below an acceptable threshold, blending processor 327 receives an exceptional signal from the corresponding demodulator. In response to the exceptional signal, and depending on other measures, processor 327 may issue a control signal concerning the stream associated with the demodulator to cause decoder 330 to mute the stream. As the exceptional signal needs to be time aligned with the portion of the stream affected by the substandard signal-to-interference ratio, delay element 335 is employed to compensate for the delay imparted to such a stream portion in traversing the deinterleaver and intervening decoders.

The foregoing hybrid IBOC-AM embodiment merely illustrates the principles of the invention. It will thus be appreciated that those skilled in the art will be able to devise numerous other arrangements which embody the principles of the invention and are thus within its spirit and scope.

For example, in the disclosed embodiment, three streams, i.e., the C-stream, $E_1$-stream and $E_2$-stream are used to represent the audio information to be transmitted. However, it will be appreciated that the number of such streams used may be higher or lower than three.

In addition, as mentioned before, an audio signal with digital quality can only be regenerated when the C-stream is viable. However, it will be appreciated that the audio signal may also be transmitted through the AM band as a host analog AM signal according to a mixed blending approach. In that approach, if the C-stream is lost and at least one $E_i$-stream is recovered in the receiver, the $E_i$-stream may be used to enhance the analog audio signal output, where i generically represents an integer greater than or equal to one. For example, the $E_i$-stream can be used to add high frequency content and/or stereo components to the analog signal. If all of the $E_i$- and C-streams are lost, the receiver would afford only the analog audio signal output.

In addition, in the disclosed embodiment, complementary quantizers are used to generate equivalent enhancement bit streams, e.g., $E_1$-stream and $E_2$-stream, for communications. However, based on the disclosure heretofore, it is apparent that a person skilled in the art may use similar complementary quantizers to generate equivalent C-streams, e.g., $C_1$-stream and $C_2$-stream, for communications. In an alternative embodiment, for instance, a(t) may be coded in accordance with the invention to yield an enhancement bit stream, and $C_1$- and $C_2$-streams at 8 kb/sec, 20 kb/sec and 20 kb/sec, respectively.

Further, in the disclosed embodiment, for example, subband 103 is used to transmit the C-stream. It will be appreciated that one may further subdivide, e.g., subband 103 equally for transmission of duplicate versions of the C-stream, or equivalent C-streams, to afford additional robustness to the core audio information.

In addition, the multistream coding schemes described above are applicable to various sizes of digital bands surrounding an analog host AM carrier at $f_c$, e.g., $f_c$±5 kHz, $f_c$±10 kHz, $f_c$±15 kHz, $f_c$±20 kHz, etc.

Further, the multistream coding schemes described above are applicable to communications of not only audio information, but also information concerning text, graphics, video, etc.

Still further, the multistream coding schemes, and the mixed blending technique described above are applicable not only to the hybrid IBOC-AM systems, but also other systems, e.g., hybrid IBOC-FM systems, satellite broadcasting systems, Internet radio systems, TV broadcasting systems, etc.

Moreover, the multistream coding schemes can be used with any other well known channel coding different than the RS coding described above such as the Bose-Chandhuri-Hocquenghem (BCH) coding, etc., with or without unequal error protection (UEP) sensitivity classifications.

In addition, in the disclosed embodiment, multicarrier modems 230*a*, 230*b* and 230*c* illustratively implement an OFDM scheme. It will be appreciated that a person skilled in the art may utilize in such a modem any other scheme such as a frequency division multiplexed tone scheme, time division multiplexed (TDM) scheme, or code division multiplexed (CDM), instead.

Further, the frequency subbands for transmission of individual bit streams in the multistrcam coding approach need not be contiguous. In addition, the channel coding and interleaving techniques applied to different subbands may not be identical.

Still further, each frequency subband may be used for transmission of multiple bit streams in the multistream coding approach by time-sharing the frequency subband in accordance with a well known time division multiple access (TDMA) scheme, or by code-sharing the frequency subband in accordance with a well known code division multiple access (CDMA) scheme, or by sharing the frequency subband in another manner in accordance with a similar implicit partitioning of the subband.

Yet still further, the power profiles of the digitally modulated signals in the multistream coding approach may not be uniform across the transmission band.

Finally, transmitter 201 and receiver 301 are disclosed herein in a form in which various transmitter and receiver functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

As noted previously, the multistream transmission and reception techniques described in conjunction with FIGS. 1 through 3 above are applicable to IBOC-FM systems as well as other types of digital broadcasting systems. FIG. 4 lists a number of examples of multistream IBOC-FM systems in accordance with the invention. For each of the systems, the table in FIG. 4 specifies the audio coder rate on each of two sidebands, the one sideband channel code rate, the two sideband channel code rate, a power profile, a source coder type (if applicable), a channel code type, and a number of streams (MS). As will be described in greater detail below, the illustrative embodiments of the present invention provide improved performance through the use of multistream coding and bit placement, transmission with introduction of time diversity, and non-uniform power profiles for different frequency bands or within a given frequency band. These features of the invention can provide significant advantages, including, for example, improved coverage area and reduced memory requirements relative to conventional systems.

Each of the systems listed in FIG. 4 utilizes both a channel code, also referred to as an inner code, and an outer code. Inner codes that may be used in the systems of FIG. 4 or other systems of the invention include block or convolutional codes, so-called "turbo" codes, and coding associated with trellis coded modulation. Examples of outer codes that may be used include CRCs, RS codes, BACH. codes, and other types of linear block codes.

Figure 5:
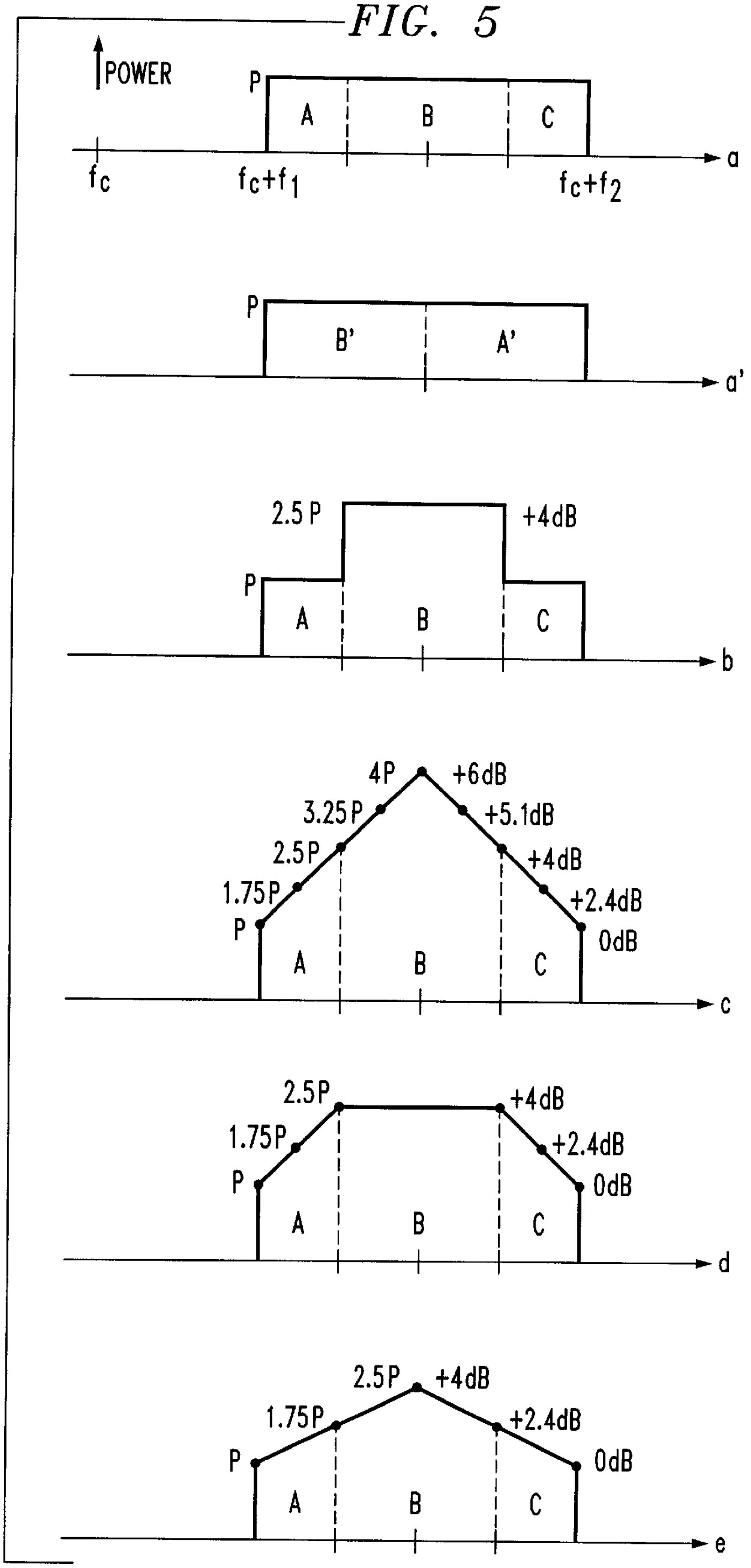
FIG. 5 shows a set of power profiles which may be used in a multistream IBOC-FM system in accordance with the invention.

System 1 in FIG. 4 is a baseline system which uses 96 kb/sec audio coding in a single stream transmission configuration over two sidebands with OFDM modulation. The two frequency sidebands for digital audio are transmitted on each side of a host analog FM signal. A uniform power profile, i.e., profile a in FIG. 5, is used. The channel coding is rate 4/5, memory 6 on each sideband with a total of rate 2/5, memory 6 in a complementary punctured pair convolutional (CPPC) channel coding configuration with both sidebands. Optimum bit placement (OBP) is used in conjunction with the channel code. CPPC codes and OBP techniques suitable for use in the IBOC-FM systems of the invention are described in, e.g., U.S. patent application Ser. No. 09/217,655, filed Dec. 21, 1998 in the name of inventors Brian Chen and Carl-Erik W. Sundberg and entitled "Optimal Complementary Punctured Convolutional Codes," which is assigned to the assignee of the present application and incorporated by reference herein.

A significant difficulty with system 1 is projected limited coverage for the digital transmission, particularly when only one sideband is available to the receiver, e.g., due to severe interference. This difficulty remains significant even if soft combining is used.

System 2 through 9 in FIG. 4 utilize one or more of the following techniques in order to provide improved signal-to-noise ratio, and thus better digital signal coverage, relative to the baseline system 1: multistream transmission, multidescriptive (MD) audio coding, a core/enhancement type of embedded audio coding such as that described above in conjunction with FIGS. 2 and 3, a lower basic audio coding rate in one sideband, bit error sensitivity classification for unequal error protection (UEP), modified power profile on the sidebands, and an increased total sideband power. For example, lowering the PAC audio coding rate per sideband to 64 kb/sec provides sufficient additional bandwidth to permit utilization of lower rate channel codes. In systems 2 through 9 of FIG. 4, using an audio coding rate of 64 kb/sec on at least one of the sidebands allows a considerably more powerful chaimel code, i.e., a rate 1/2 convolutional channel code, to be used in place of the rate 4/5 code of the baseline system 1.

Other techniques in accordance with the invention may also be used to further improve performance. For example, an increase in frequency band and bit stream time diversity may be provided in one or more of the systems of FIG. 4 by introducing delay between bit streams in different sidebands and/or within the same sideband. Such an arrangement may be used to provide improved performance in the presence of fading. Time diversity techniques suitable for use with the present invention are described in greater detail in U.S. patent application Ser. No. 09/102,776, filed Jun. 23, 1998 in the name of inventors Robert L. Cupo et al. and entitled "Broadcast Method Having Time and Frequency Diversity," which is assigned to the assignee of the present application and incorporated by reference herein.

Generation of multiple source coded streams may be achieved using multistream PAC encoding techniques such as bit-stream partitioning, multidescriptive coding, and embedded coding. A particular multistream transmission system may employ one or more of these techniques for producing a multistream representation of a source signal. In bit-stream partitioning, source bits are partitioned into two or more classes of differing sensitivity to bit errors, each of which may be provided with a different level of error protection in accordance with a UEP technique. The invention may be utilized with UEP techniques such as those described in U.S. patent application Ser. No. 09/022,114, filed Feb. 11, 1998 in the name of inventors Deepen Sinha and Carl-Erik W. Sundberg and entitled "Unequal Error Protection For Perceptual Audio Coders,"and U.S. patent application Ser. No. 09/163,656, filed Sep. 30, 1998 in the name of inventors Deepen Sinha and Carl-Erik W. Sundberg and entitled "Unequal Error Protection for Digital Broadcasting Using Channel Classification," both of which are assigned to the assignee of the present application and incorporated by reference herein.

In multidescriptive coding, source bits are encoded into two or more equivalent streams such that any of these streams may be decoded independently as well as in combination with other substreams to provide different levels of recovered audio quality. In embedded coding, source bits are encoded with a core or essential bit stream and one or more enhancement bit streams. Exemplary multidescriptive and embedded coding techniques suitable for use with the present invention are described in U.S. patent application Ser. No. 09/280,785, filed Mar. 29, 1999 in the name of inventors Peter Kroon and Deepen Sinha and entitled "Multirate Embedded Coding of Speech and Audio Signals," which is assigned to the assignee of the present application and incorporated by reference herein.

The power profiles listed in FIG. 4 are illustrated in FIG. 5. The power profiles referred to herein as a+ and a'+ correspond to power profiles a and a', respectively, with a uniform power increase of 3 dB over the entire sideband. FIG. 5 shows only a single sideband of each of the power profiles, and it should be understood that the other sideband may be configured in the same manner. Increased power levels within the profiles are referenced to a power level P, and expressed as a multiple of P, e.g., 2.5 P is the increased level in profile b. The increased power levels are also expressed in dB relative to level P, i.e., level P corresponds to 0 dB. The power profiles shown in FIG. 5 are examples only, and numerous other types of profiles may be used. The particular profile selected will generally depend on certain application-specific factors, such as, e.g., the nature of interference effects such as self-interference and/or adjacent channel interference. Additional details regarding non-uniform power profiles suitable for use with the present invention may be found in U.S. patent application Ser. No. 09/064,938, filed Apr. 22, 1998 in the name of inventors Brian Chen and Carl-Erik W. Sundberg and entitled "Technique for Communicating Digitally Modulated Signals Over an Amplitude-Modulation Frequency Band," which is assigned to the assignee of the present application and incorporated by reference herein.

Figure 6:
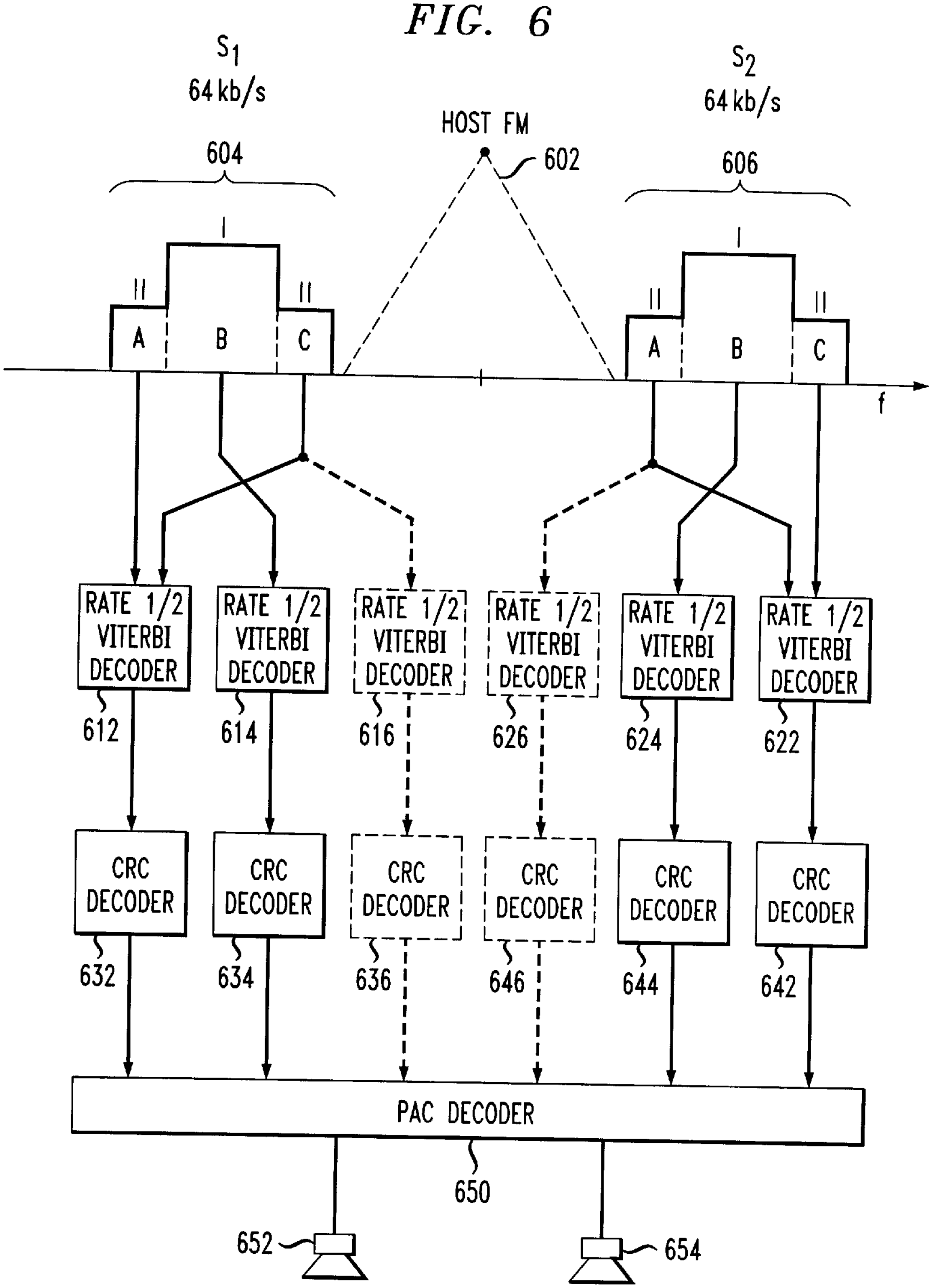
FIGS. 6 and 7 illustrate the operation of multistream IBOC-FM systems 7 and 9, respectively, of FIG. 4.
Figures 7, 8:
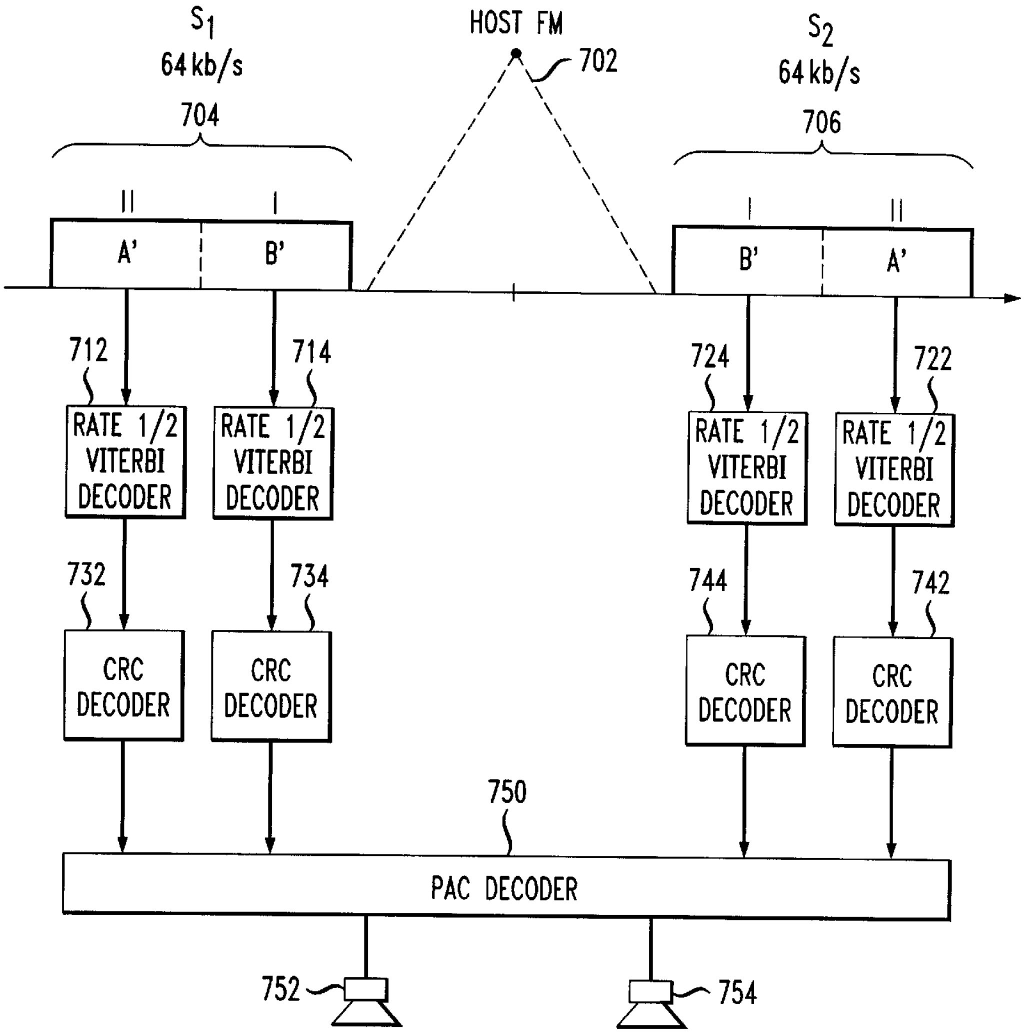
FIG. 8 is a table showing blend modes in a four-stream IBOC-FM system in accordance with the invention.

FIGS. 6 and 7 illustrate in greater detail the operation of systems 7 and 9 of FIG. 4. Systems 7 and 9 represent preferred embodiments of an IBOC-FM system in accordance with the invention. Both of these systems utilize an overall source coder rate of 128 kb/sec, a rate 1/2 convolutional channel code, multidescriptive coding, two-level UEP and at least four bit streams. Referring to FIG. 6, an audio signal is first encoded using a multidescriptive coding technique to produce two streams $S_1$ and $S_2$ at 64 kb/sec each. The streams $S_1$ and $S_2$ are transmitted on a host FM signal 602 as sidebands 604 and 606, respectively. The transmission of multidescriptive streams $S_1$ and $S_2$ in different frequency bands provides both information diversity and frequency diversity in accordance with the invention. Although FIG. 4 indicates that system 7 may utilize power profile b, c, d or e of FIG. 5, the embodiment illustrated in FIG. 6 uses power profile b. This profile includes subbands A, B and C in each of the two sidebands 604 and 606, as shown.

The two streams $S_1$ and $S_2$ in FIG. 6 are divided into two classes, class I and class II, using a bit stream classifier. Class I bits represent the more important audio bits, and are provided with a higher level of error protection by associating them with the high-power subband B of the non-uniform power profile b. Class II bits, of lesser importance to reconstructed audio quality than the class I bits, are provided with a lower level by associating them with the lower-power subbands A and C of the power profile b. The subbands A, B and C of each sideband 604 and 606 are encoded for transmission using an inner rate 1/2 convolutional code, and a CRC outer code. The system 7 transmission may utilize a four-stream implementation or a six-stream implementation.

It should be noted that the total gain for bits of class I with power profile b is on the order of 8 to 9.4 dB on a Gaussian channel. These gain numbers are expected to be higher for fading channels. In certain applications, a power profile of type c in FIG. 5 may be used in order to better maintain a proper balance between classes I and II.

FIG. 6 also shows a portion of a receiver for decoding the multiple streams of system 7. The receiver includes rate 1/2 Viterbi decoders 612, 614, 616 and CRC decoders 632, 634 and 636 for use in decoding the respective inner and outer code for stream $S_1$, and rate 1/2 Viterbi decoders 622, 624, 626 and CRC decoders 642, 644 and 646 for use in decoding the respective inner code and outer code for stream $S_2$. In the four-stream implementation, illustrated by solid lines in FIG. 6, subbands A and C of sideband 604 are decoded in Viterbi decoder 612 and CRC decoder 632, subband B of sideband 604 is decoded in Viterbi decoder 614 and CRC decoder 634, subbands A and C of sideband 606 are decoded in Viterbi decoder 622 and CRC decoder 642, and subband B of sideband 606 is decoded in Viterbi decoder 624 and CRC decoder 644. The decoders 616, 626, 636 and 646, shown in dashed outline in FIG. 6, are not used in this implementation, and may be eliminated from the receiver. It should be noted that, in the systems illustrated in FIGS. 6 and 7, the CRC block length may be optimized using conventional techniques. List Viterbi algorithms, which are well known in the art, may also be used in the decoding process.

The six-stream implementation of the receiver for system 7 decodes subband C of sideband 604 in Viterbi decoder 616 and CRC decoder 636, and subband A of sideband 606 in Viterbi decoder 626 and CRC decoder 646. As in the previous implementation, subband A of sideband 604 is decoded in Viterbi decoder 612 and CRC decoder 632, and subband C of sideband 606 is decoded in Viterbi decoder 622 and CRC decoder 642. In either of these example implementations, the outputs of the CRC decoders are applied to a PAC decoder 650, which generates reconstructed audio output signals for applications to speakers 652, 654.

Referring now to FIG. 7, an audio signal is first encoded using a multidescriptive coding technique to produce two streams $S_1$ and $S_2$ at 64 kb/sec each. The streams $S_1$ and $S_2$ are transmitted on a host FM signal 702 as sidebands 704 and 706, respectively. Although FIG. 4 indicates that system 7 may utilize power profile a or a+ of FIG. 5, the embodiment illustrated in FIG. 7 uses power profile a+. This profile includes subbands A' and B' in each of the two sidebands 704 and 706, as shown.

As in system 7, the two streams $S_1$ and $S_2$ in system 9 are divided into two classes, class I and class II, using a bit stream classifier. Class I bits represent the more important audio bits, and are provided with a higher level of error protection by associating them with subband B' of the uniform power profile a+. The subband B' represents the subband of the power profile which is less susceptible to interference, e.g., first adjacent channel interference. Class II bits, of lesser importance to reconstructed audio quality than the class I bits, are provided with a lower power level by associating them with the subband A' of the power profile a+. In other words, the most sensitive bits are transmitted in subband B' on both sides of the host and the least sensitive bits are transmitted in subband A' on both sides. This UEP arrangement makes use of the fact that first adjacent interferers generally cause a higher level of interference in subband A' than in subband B'. Performance gains are thus obtained from this type of frequency division UEP by exploiting interference variations across the sidebands. The subbands A' and B' of each sideband 704 and 706 are encoded for transmission using an inner rate 1/2 convolutional code, and a CRC outer code. The system 9 transmission utilizes a four-stream implementation.

FIG. 7 also shows a portion of a receiver for decoding the multiple streams of system 9. The receiver includes rate 1/2 Viterbi decoders 712, 714 and CRC decoders 732, 734 for use in decoding the respective inner and outer code for stream $S_1$, and rate 1/2 Viterbi decoders 722, 724 and CRC decoders 742, 744 for use in decoding the respective inner code and outer code for stream $S_2$. In the four-stream implementation subband A' of sideband 704 is decoded in Viterbi decoder 712 and CRC decoder 732, subband B' of sideband 704 is decoded in Viterbi decoder 714 and CRC decoder 734, subband A' of sideband 706 is decoded in Viterbi decoder 722 and CRC decoder 742, and subband B' of sideband 706 is decoded in Viterbi decoder 724 and CRC decoder 744. The outputs of the CRC decoders 732, 734, 742 and 744 are applied to a PAC decoder 750, which generates reconstructed audio output signals for applications to speakers 752, 754. It should be noted that the exemplary systems illustrated in FIGS. 6 and 7 may be configured to introduce delay between the various multiple bit streams, in accordance with the previously-mentioned time diversity techniques.

Systems 7 and 9 as described above include several built-in digital blend modes that provide graceful degradation in the presence of interference or other types of transmission and/or reception problems. FIG. 8 is a table summarizing these blend modes for a four-stream IBOC-FM system, such as the four-stream implementations of systems 7 and 9. For purposes of FIG. 8, the class I and class II streams associated with one of the sidebands are designated as class I' and class II' streams, respectively, in order to distinguish them from the class I and II bits associated with the other sideband. It is assumed in this example that any delay introduced between the bit streams for time diversity purposes has been removed by the receiver.

The first column of the table in FIG. 8 specifies the available streams, i.e., which streams can be received without significant degradation in a given transmission situation, and the second column indicates the corresponding quality of the reconstructed audio. For example, if streams corresponding to classes I, II, I' and II' are available, the resultant reconstructed audio quality is on the order of 96 kb/sec single-stream PAC quality. Availability of streams corresponding to classes (I+II+II') or classes (II+I'+II') results in better than 64 kb/sec single-stream PAC quality. Availability of streams corresponding to classes (I+II) or classes (I'+II') results in better than analog FM quality. The quality level associated with availability of streams corresponding to classes (I+I') is unknown, while the quality level associated with availability of streams corresponding to classes I or I' is expected to be severely degraded.

FIG. 9 is a table providing examples of rate 1/2 channel codes that may be used in systems 2 through 9. M is the code memory and $d_f$ is the free Hamming distance. The code generators are given in octal form and weight spectra ($a_d$ event, $c_d$ bit) are also given. It should be noted that the rate 1/2 codes with M=7 and M=9 have particularly low weights. It is estimated that a choice of M=8, i.e., 256 states, represents a reasonable complexity level for the channel code choice. A number of the rate 1/2 codes shown in the table of FIG. 9 are from T. Ottosson, "Coding, Modulation and Multiuser Decoding for DS-CDMA Systems," Ph.D. thesis, Chalmers University of Technology, Gothenburg, Sweden, November 1997. Of course, many other types and arrangements of codes could be used in the multistream IBOC-FM systems of the invention.

FIGS. 10 through 13 illustrate performance improvements in an exemplary multistream IBOC-FM system in accordance with the invention. FIGS. 10, 11 and 12 show gains in signal-to-noise ratio (SNR) resulting from the use of rate 1/2, rate 2/3 and rate 3/4 codes, respectively, relative to the rate 4/5, M=6 code in the baseline system 1. Uniform power profile a of FIG. 5 and a Gaussian channel is assumed in each case. In FIG. 10, the gains are shown for the one-sided rate 4/5 system with $d_f$=4, and for the corresponding double-sided rate 2/5 system with $d_f$=11. The rate 2/3 and rate 3/4 codes are from G. C. Clark Jr. and J. B. Cain, "Error Correction Coding for Digital Communication," Plenum Press, New York, 1981.

It should be noted that the audio coder rate for a system in which the baseline rate is changed to rate 1/2 on one sideband, with all other parameters unchanged, is 60 kb/sec. Utilizing an audio coder rate of 64 kb/sec in such a system will require a channel code rate of 8/15. Although such codes are available, these codes are generally optimized with rate compatible punctured code (RCPC) constraints from puncturing a mother code of rate 1/3. Codes providing better performance may be obtained using another mother code, e.g., a rate 1/2 mother code.

It can be seen from FIG. 10 that the one-sided 60 kb/sec, rate 1/2 system with M=6 is comparable in SNR performance to the double-sided 96 kb/sec, rate 2/5 system with M=6. It is also apparent that the rate 1/2 systems with $M\geqq8$ are superior to the rate 2/5 systems with M=6. In addition, the double-sided 120 kb/sec, rate 1/2, M=6 system is comparable to the 96 kb/sec, rate 2/5, M=6 system in asymptotic error rate performance for the Gaussian channel. Embodiments of the invention in which there is insufficient bandwidth for a rate 1/2 code may utilize, e.g., a rate 8/15 code instead, resulting in somewhat smaller gains in SNR. A straightforward code search may be performed to determine acceptable rate 8/15 codes for such an embodiment.

FIG. 13 summarizes performance measurements based on simulations of the above-described multistream IBOC-FM systems. For the Gaussian channel, the simulations predict a gain of approximately 8 dB in subband B with a rate 1/2 code and a 60 kb/sec audio coder. In subbands A and C, the SNR gain is approximately 4 dB over the baseline 96 kb/sec, rate 4/5 code with uniform power profile a. FIG. 13 shows the estimated gains in channel SNR ($E_s/N_o$) over the baseline rate 4/5 system 1. The two UEP error probabilities in subband B (or B') and in subbands A plus C (or A') are denoted as $P_I$ and $P_{II}$, respectively.

FIG. 13 indicates that, for power profile b, the two error rate probabilities $P_I$ and $P_{II}$, are about 4 dB apart. It is believed that the overall system in this case will be performance limited by $P_{II}$. With power profile c, the two error rate probabilities are closer (and both better) than with profile b. Power profile c may therefore be a preferable solution in applications in which the interference levels are acceptable. The shape of profile c can also be further modified as necessary in a particular application. One such possible modification is profile d of FIG. 5, which has a lower total sideband power increase than profile c and $P_I$ and $P_{II}$, values which are even closer together than those for profile c. The optimization of the shape of the power profile may be based on a number of factors, including interference to the host signal, first adjacent interference levels and FCC emission masks or other requirements. For fading channels, the gains in FIG. 13 may be viewed as lower bounds.

The two-level UEP in the simulations summarized in FIG. 13 is obtained using the same rate 1/2 code in both classes I and II with different average power levels in the two classes. Thus, there is no UEP gain with this approach for the uniform power profile a. In other embodiments of the invention, a UEP gain can be obtained by employing two separate channel codes with rates higher (class II) and lower (class I) than 1/2, with an average rate of 1/2. Such an approach can be used, e.g., with a uniform 3 dB power increase over the entire sideband, i.e., power profile a+, leading to a similar result as that provided by power profile d. The channel codes in such an embodiment can be found by code search. Alternatively, a frequency division UEP approach can be utilized, such that the same rate 1/2 code is used in subbands B and (A+C). In this case there is no gain on a uniform noise channel, but gains are achieved, e.g., for first adjacent interference type of channels. Additional details regarding this frequency division UEP approach can be found in the above-cited U.S. patent application Ser. No. 09/163,656.

There are a number of different options for the number of tones and structure of OFDM modem(s) for use in the illustrative multistream systems listed in FIG. 4. One possible implementation uses two 70 kHz sidebands with about 90 tones on each side. A single 512 fast Fourier transform (FFT) is used in this example implementation, and the number of tones per kHz is 1.29. Another implementation uses twice as many tones, i.e., about 180 tones per sideband, and a single 1024 FFT with zero padding. The symbol time in this implementation is twice as long as in the previous example. In addition, for the same multipath, the relative overhead for the cyclic extension is reduced by a factor of two. The number of tones per kHz in this implementation is 2.57. Yet another option is to use two separate OFDM modems for the upper and lower sideband. With, e.g., two separate 256 FFTs, the cyclic extension overhead is now even less than with the single 1024 FFT with zero padding. The number of tones per kHz in this case is 3.66. Although the FFTs are simpler, two modems have to be used.

When using the non-uniform power profiles of FIG. 5, it is important that the interleaver design take into account the power profile, even if the channel is a Gaussian channel. This is because different symbols may have different power levels in the OFDM tones. If an entire error event of the convolutional code is associated with only symbols transmitted on low power level tones, the performance is degraded. To obtain the "average power level" behavior of the code, the error events should typically consist of a mixture of high and low power levels. Fortunately, dominating convolutional code error events arc typically short in nature. Additional considerations in the interleaver design include time-selective and frequency-selective fading. Short of doing joint convolutional code and interleaver design, there is no absolute guarantee that the average power level behavior will be achieved, and it is possible that a small loss may be incurred.

Alternative embodiments of the invention can utilize other types of outer codes, e.g., RS, BCH or other linear block codes, other types of inner codes, e.g., various types of convolutional codes, turbo codes, or coding associated with trellis coded modulation, and a variety of different types of interleaving, e.g., block interleaving, convolutional interleaving, or random interleaving. The alternative embodiments could also utilize only an inner code and no outer code, or vice-versa. Embodiments which utilize an RS, BCH or other similar type of error correcting outer code can of course use the code for error correction.

It should be noted that one or more of the frequency bands associated with a given host carrier signal in an embodiment of the invention may be arranged so as to overlap with the carrier. Such an embodiment may utilize the precancellation techniques described in, e.g., U.S. patent application Ser. No. 08/704,470 filed Aug. 22, 1996 in the names of inventors Haralabos C. Papadopolous and Carl-Erik W. Sundberg and entitled "Technique for Simultaneous Communications of Analog Frequency-Modulated and Digitally Modulated Signals Using Precanceling Scheme," and U.S. patent application Ser. No. 08/834,541 filed Mar. 18, 1997 in the names of inventors Brian Chen and Carl-Erik W. Sundberg and entitled "Band Insertion and Precancellation Technique for Simultaneous Communications of Analog Frequency-Modulated and Digitally Modulated Signals," both of which are assigned to the assignee of the present application and incorporated by reference herein.

The invention can be applied to decoding of a wide variety of frame formats, including time division multiplexed (TDM), frequency division multiplexed (FDM) and code division multiplexed (CDM) formats, as well as combinations of TDM, FDM, CDM and other types of frame formats. Furthermore, although not described in detail herein, numerous different types of modulation techniques may be used in conjunction with the invention, including, e.g., single-carrier modulation in every channel, or multi-carrier modulation, e.g., OFDM in every channel. A given carrier can be modulated using any desired type of modulation technique, including, e.g., a technique such as m-QAM, m-PSK or trellis coded modulation.

As previously noted, one or more of the techniques of the invention can be applied to the transmission of digital information other than audio, such as speech, data, video, images and other types of information. Although the illustrative embodiments use audio information, such as that generated by a PAC encoder, the invention is more generally applicable to digital information in any form and generated by any type of compression technique. For example, the embedded audio coder in the exemplary transmitter 201 of FIG. 2 may alternatively be implemented as a multiple description audio coder, or as a combination of a multiple description audio coder and an embedded audio coder. The invention may be implemented in numerous applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of processing at least one information signal for transmission in a communication system, the method comprising the steps of:

generating a plurality of bit streams from the information signal, each of the bit streams corresponding to a separate representation of the information signal and being separated into a plurality of classes of bits; and transmitting the bit streams in corresponding portions of one or more frequencybands associated with a host carrier signal, whereby a given one of the classes of bits associated with one of the bit streams and having a greater sensitivity to interference than another of the classes of bits associated with that bit stream is transmitted in a corresponding one of the portions configured so as to have a lower susceptibility to interference than another one of the portions.

2. The method of claim 1 wherein the host carrier signal is an FM carrier signal.

3. The method of claim 1 wherein the information signal comprises an audio signal.

4. The method of claim 1 wherein the transmitting step includes transmitting the bit streams such that at least one of the bit streams is transmitted with a different transmission characteristic than another of the bit streams.

5. The method of claim 4 wherein the different transmission characteristic includes at least one of a different level of error protection and a different portion of a non-uniform transmission power profile.

6. The method of claim 1 wherein the generating step includes generating first and second multiple description bit streams representative of the information signal.

7. The method of claim 6 wherein the transmitting step further includes transmitting the first multiple description bit stream on a first sideband of the host carrier signal, and transmitting the second multiple description bit stream on a second sideband of the host carrier signal.

8. The method of claim 7 wherein the generating step further includes separating each of the first and second multiple description bit streams into at least first and second class bit streams, wherein each of the first and second class bit streams corresponds to a different level of error protection.

9. The method of claim 8 wherein the transmitting step further includes transmitting the first and second class bit streams associated with the first multiple description bit stream in respective first and second subbands of the first sideband, and transmitting the first and second class bit streams associated with the second multiple description bit stream in respective first and second subbands of the second sideband.

10. The method of claim 9 wherein each of the subbands of at least one of the first and second sidebands is associated with a different level of error protection.

11. The method of claim 9 wherein each of the subbands of at least one of the first and second sidebands is associated with at least one of a different portion of a non-uniform transmission power profile and a different susceptibility to interference.

12. The method of claim 1 wherein the generating step includes generating at least a first bit stream having a first coding rate and a second bit stream having a coding rate lower than the first coding rate, and wherein the transmitting step includes transmitting at least the first bit stream in a first sideband of the host carrier signal and the second bit stream in a second sideband of the host carrier signal.

13. The method of claim 1 further including the step of introducing delay between at least a subset of the bit streams prior to the transmitting step in order to provide time diversity in the system.

14. An apparatus for processing at least one information signal for transmission in a communication system, the apparatus comprising:

a transmitter operative: (i) to generate a plurality of bit streams from the information signal, each of the bit streams corresponding to a separate representation of the information signal and being separated into a plurality of classes of bits, and (ii) to transmit each of the bit streams in corresponding portions of one or more frequency bands associated with a host carrier signal, whereby a given one of the classes of bits associated with one of the bit streams and having a greater sensitivity to interference than another of the classes of bits associated with that bit stream is transmitted in a corresponding one of the portions configured so as to have a lower susceptibility to interference than another one of the portions.

15. The apparatus of claim 14 wherein the host carrier signal is an FM carrier signal.

16. The apparatus of claim 14 wherein the information signal comprises an audio signal.

17. The apparatus of claim 14 wherein at least one of the bit streams is transmitted with a different transmission characteristic than another of the bit streams.

18. The apparatus of claim 17 wherein the different transmission characteristic includes at least one of a different level of error protection and a different portion of a non-uniform transmission power profile.

19. The apparatus of claim 14 wherein the transmitter is further operative to generate first and second multiple description bit streams representative of the information signal.

20. The apparatus of claim 19 wherein the transmitter is further operative to transmit the first multiple description bit stream on a first sideband of the host carrier signal, and to transmit the second multiple description bit stream on a second sideband of the host carrier signal.

21. The apparatus of claim 20 wherein the transmitter is further operative to separate each of the first and second multiple description bit streams into at least first and second class bit streams, wherein each of the first and second class bit streams corresponds to a different level of error protection.

22. The apparatus of claim 21 wherein the transmitter is further operative to transmit the first and second class bit streams associated with the first multiple description bit stream in respective first and second subbands of the first sideband, and to transmit the first and second class bit streams associated with the second multiple description bit stream in respective first and second subbands of the second sideband.

23. The apparatus of claim 22 wherein each of the subbands of at least one of the first and second sidebands is associated with a different level of error protection.

24. The apparatus of claim 22 wherein each of the subbands of at least one of the first and second sidebands is associated with at least one of a different portion of a non-uniform transmission power profile and a different susceptibility to interference.

25. The apparatus of claim 14 wherein the transmitter is further operative to generate at least a first bit stream having a first coding rate and a second bit stream having a coding rate lower than the first coding rate, and to transmit at least the first bit stream in a first sideband of the host carrier signal and the second bit stream in a second sideband of the host carrier signal.

26. The apparatus of claim 14 wherein the transmitter is further operative to introduce delay between at least a subset of the bit streams prior to transmission in order to provide time diversity in the system.

27. An apparatus for processing at least one information signal for transmission in a communication system, the apparatus comprising:

means for generating a plurality of bit streams from the information signal, each of the bit streams corresponding to a separate representation of the information signal and being separated into a plurality of classes of bits; and means for transmitting the bit streams in corresponding portions of one or more frequency bands associated with a host carrier signal;

whereby a given one of the classes of bits associated with one of the bit streams and having a greater sensitivity to interference than another of the classes of bits associated with that bit stream is transmitted in a corresponding one of the portions configured so as to have a lower susceptibility to interference than another one of the portions.

28. A method of processing at least one information signal in a communication system, the method comprising the steps of:

receiving a plurality of bit streams, each of the bit streams corresponding to a separate representation of the information signal and being separated into a plurality of classes of bits, wherein the bit streams are transmitted in corresponding portions of one or more frequency bands associated with a host carrier signal, and further wherein a given one of the classes of bits associated with one of the bit streams and having a greater sensitivity to interference than another of the classes of bits associated with that bit stream is transmitted in a corresponding one of the portions configured so as to have a lower susceptibility to interference than another one of the portions; and reconstructing the information signal from the received bit streams.

29. An apparatus for processing at least one information signal in a communication system, the apparatus comprising:

a receiver operative: (i) to receive a plurality of bit streams, each of the bit streams corresponding to a separate representation of the information signal and being separated into a plurality of classes of bits, wherein the bit streams are transmitted in corresponding portions of one or more frequency bands associated with a host carrier signal, and further wherein a given one of the classes of bits associated with one of the bit streams and having a greater sensitivity to interference than another of the classes of bits associated with that bit stream is transmitted in a corresponding one of the portions configured so as to have a lower susceptibility to interference than another one of the portions, and (ii) to reconstruct the information signal from the received bit streams.

30. An apparatus for processing an encoded signal, said encoded signal being produced by generating a plurality of bit streams from an input signal, each of the bit streams corresponding to a separate representation of the input signal and being separated into a plurality of classes of bits, said bit streams being transmitted through a communications channel in corresponding portions of one or more frequency bands associated with a host carrier signal, whereby a given one of the classes of bits associated with one of the bit streams and having a greater sensitivity to interference than another of the classes of bits associated with that bit stream is transmitted in a corresponding one of the portions configured so as to have a lower susceptibility to interference than another one of the portions, the apparatus comprising:

means for receiving said encoded signal from said communications channel;

means for decoding said received encoded signal; and means for recovering said input signal from said decoded signal.

* * * * *